United States Patent [19]
Chiovitti

[11] Patent Number: 5,337,965
[45] Date of Patent: Aug. 16, 1994

[54] METHOD AND APPARATUS FOR RECYCLING ASPHALT BASED ROOFING MATERIAL

[75] Inventor: Domenico Chiovitti, Boucherville, Canada

[73] Assignee: Finoll Recycling Ltd., Ontario, Canada

[21] Appl. No.: 958,801

[22] Filed: Oct. 9, 1992

[51] Int. Cl.$^5$ .................. B03B 1/00; B03D 1/02; B02C 19/12; B02C 23/36
[52] U.S. Cl. .................................. 241/19; 241/20; 241/24; 241/DIG. 38; 209/164; 209/173; 208/425; 208/424; 208/39
[58] Field of Search .............. 209/164, 166, 173; 208/425, 39, 424; 241/21, 24, DIG. 38, 20

[56] References Cited

U.S. PATENT DOCUMENTS

| | | | |
|---|---|---|---|
| 108,334 | 10/1870 | Denton . | |
| 512,348 | 1/1894 | Wilkinson . | |
| 597,892 | 1/1898 | Wilkinson . | |
| 1,190,633 | 7/1916 | Cook et al. . | |
| 2,075,835 | 4/1937 | Spafford . | |
| 2,128,191 | 8/1938 | Reynolds . | |
| 2,130,144 | 9/1938 | McClave . | |
| 2,455,923 | 12/1948 | Fair, Jr. . | |
| 2,967,116 | 1/1961 | Hollinger et al. . | |
| 3,054,230 | 9/1962 | Logue . | |
| 3,060,044 | 10/1962 | Lohnas et al. . | |
| 3,197,413 | 7/1965 | Wingerd . | |
| 3,235,482 | 2/1966 | Knowles et al. . | |
| 3,235,483 | 2/1966 | McCoy et al. . | |
| 3,250,394 | 5/1966 | Clark | 208/425 |
| 3,260,610 | 7/1966 | Belak . | |
| 3,271,293 | 9/1966 | Clark | 208/425 |
| 3,305,474 | 2/1967 | Knowles et al. . | |
| 3,671,615 | 6/1972 | Price . | |
| 3,718,536 | 2/1973 | Downs et al. . | |
| 3,784,464 | 1/1974 | Kaminsky | 210/520 |
| 4,058,406 | 11/1977 | Raponi . | |
| 4,096,057 | 6/1978 | Porritt . | |
| 4,100,059 | 7/1978 | Jinno . | |
| 4,111,730 | 9/1978 | Balatinecz . | |
| 4,172,025 | 10/1979 | Porteous | 208/425 |
| 4,197,014 | 4/1980 | Jinno . | |
| 4,222,851 | 9/1980 | Good . | |
| 4,250,023 | 2/1981 | Samis et al. . | |
| 4,269,693 | 5/1981 | Hastie . | |
| 4,325,641 | 4/1982 | Babus . | |
| 4,359,381 | 11/1982 | Jinno . | |
| 4,395,326 | 7/1983 | Cukier . | |
| 4,401,645 | 8/1983 | Gisler . | |
| 4,416,764 | 11/1983 | Gikis | 210/519 |
| 4,477,250 | 10/1984 | Brashears et al. . | |
| 4,517,072 | 5/1985 | Cukier et al. . | |
| 4,545,892 | 10/1985 | Cymbalisty . | |
| 4,706,893 | 11/1987 | Brock . | |
| 4,802,139 | 1/1989 | Sasaki . | |
| 4,934,111 | 6/1990 | Hashish et al. . | |
| 4,946,597 | 8/1990 | Sury | 208/425 |
| 5,066,388 | 11/1991 | Ross . | |
| 5,098,025 | 3/1992 | Drouin et al. . | |
| 5,201,472 | 4/1993 | Brock . | |
| 5,217,530 | 6/1993 | Grzybowski . | |
| 5,242,580 | 9/1993 | Sury | 208/425 |

FOREIGN PATENT DOCUMENTS 680576 2/1964 Canada .

*Primary Examiner*—Thomas M. Lithgow
*Attorney, Agent, or Firm*—Irvin A. Lavine

[57] ABSTRACT

A method and apparatus for recycling asphalt based roofing material which typically comprises a body of asphalt and fiber, with aggregate on and adhered to the asphalt. The asphalt bodies, with aggregate, are subjected to action to separate or disengage the aggregate from the asphalt body without substantially reducing the size of the aggregate. Disengagement is effected by causing asphalt bodies with aggregate to impact on each other. Disengagement may be effected by placing asphalt bodies with aggregate in water to form in a slurry, which is agitated, as by an impeller. The asphalt bodies float to the top of the liquid, which is a non-solvent for asphalt, and are removed and dewatered; the aggregate of undiminished size is separately recovered.

15 Claims, 3 Drawing Sheets

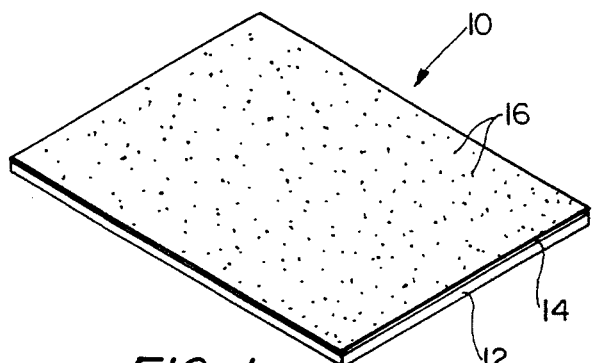
FIG. 1
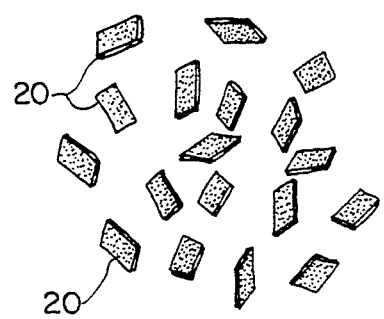
FIG. 2
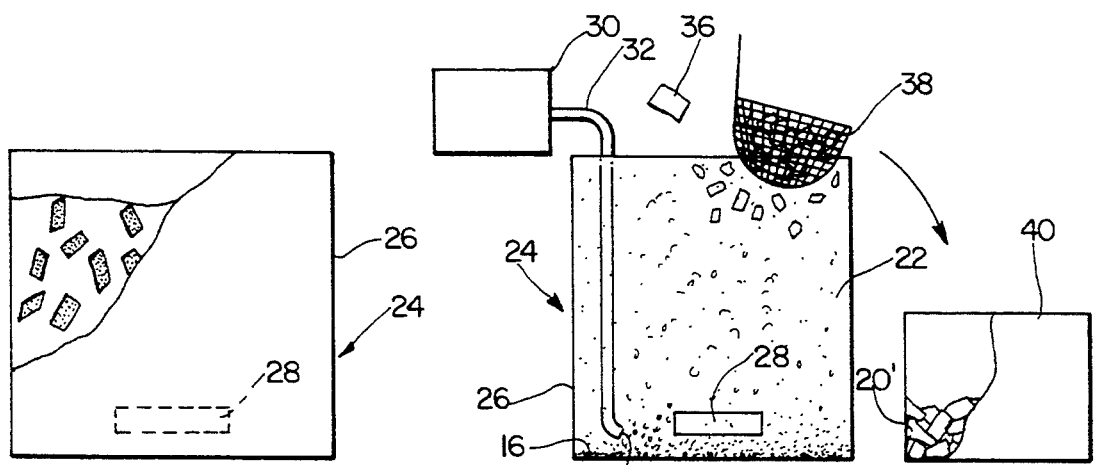
FIG. 3
FIG. 4
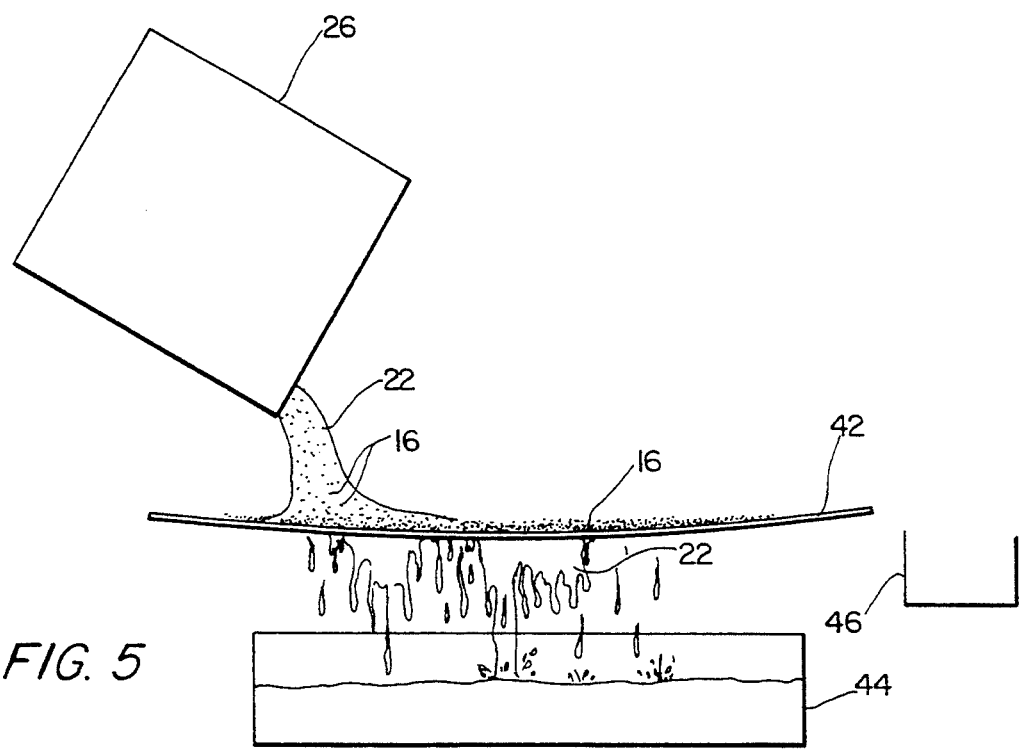
FIG. 5

METHOD AND APPARATUS FOR RECYCLING ASPHALT BASED ROOFING MATERIAL

BACKGROUND OF THE INVENTION

The present invention pertains to the recycling of asphalt based roofing materials to recover the constituent parts thereof.

FIELD OF THE INVENTION

The asphalt-based roofing materials herein referred to are such widely used products as roof shingles and built up roofing material. In both cases, the constituent parts are substantially identical, these being an asphalt body having a fiber material within it, and is referred to as an asphalt-fiber body. To this body, there is adhered a quantity of aggregate. Aggregate is a mineral material, primarily rock, which has been crushed to a predetermined size. Typical aggregate used in roofing materials may have many other uses, such as in construction work, where the aggregate is combined with cement.

It has long been recognized that asphalt-based roofing material deteriorates in use, and is replaced with new roofing material. It is known to recycle such roofing materials to recover and re-use the asphalt. It is now recognized that not only is it desirable to recycle such materials, but that this is becoming an imperative, since there has arisen a substantial problem with the disposal of such used material: landfills are becoming filled with discarded products, including discarded roofing materials, and there is a growing resistance to disposal of used roofing material by deposit in landfills.

A number of disclosures of methods and apparatus for recovering material from roofing waste are known in the prior art.

Hastie U.S. Pat. No. 4,269,693 discloses a process for recovering bitumen (asphalt) from roofing felt which is made of bitumen, fibers and aggregate. The waste product is first cooled to a temperature of 0° C. to 10°, and then comminuted to a particle size of less than 10 mm (about 0.4 inches), and preferably less than 5 mm (about 0.2 inches): comminution is accomplished by using a chain flail. The comminuted particles are fed into a tank of water, where the aggregate drops to the bottom, the bitumen and fibers floating at or near the surface of the water, and are collected by being skimmed off. The collected bitumen (asphalt) particles are melted, and the melted material is filtered to separate the fibers from the bitumen. The process of this patent has a number of deficiencies. The requirement that the roofing material be reduced in temperature causes the process to be expensive, because of the energy required for cooling. The product which can be recovered is limited to the asphalt and fiber, since the chain flail will cause all or a substantial portion of the aggregate to be substantially reduced in size, and possibly to be reduced in size to a powder; that is, it will have been pulverized by the chain flail.

Drouin et al. U.S. Pat. No. 5,098,025 discloses a process for recycling an asphalt-containing waste product, such as a shingles, by shredding the shingles, then grinding in a comminution mill, such as a SZEGO mill, a ball mill or a roller mill, to break them into particles of 10 mesh or less in water or a solvent. The mixture of asphalt particles and aggregate is added to a similar slurry of new (not waste) product, and the resulting slurry is used directly, i.e., without separation of the aggregate from the asphalt particles, to produce a new asphalt product. One new asphalt product disclosed is asphalt fiberboard (Example 1) which is made by grinding asphalt roofing shingles with water in a ball mill to produce a water-based, waste product slurry of between 10% and 60% consistency; the particles are ground to a size less than 10 mesh, and preferably between 65 and 425 mesh. This slurry is added to a slurry used to make asphalt fiberboard. In another example (Example 2), asphalt roofing shingles are ground with a solvent in a ball mill to produce a solvent-based, waste product mixture, with consistency ranging between 10% and 85%, and is used in the production of cut-back asphalt products to replace new asphalt used in these products; the asphalt products may be used as waterproof and damp-proofing coating products. If the product is a coating product, the grinding operation produces a particle size averaging between 65 and 425 mesh. In a further example (Example 3), asphalt roofing shingles are ground up with water and a surfactant to produce a water-based waste product emulsion, which may be used to replace asphalt and other components used in asphalt emulsion products, such as roof coating, waterproofing and damp-proofing agents. The process employed is the shredding of shingles and then grinding them in a ball mill to produce a consistency between 10% and 60%. Black paper waste containing cellulosic fiber and asphalt is processed (Example 4) by being pulped in water providing a 1%-25% consistency and a water content of 75%-99%. The pulp is used directly to make fiberboard, or refined in a disk refiner, and then used to make fiberboard. The grinding of the shredded shingles in a comminution mill results in the application of forces to the aggregate by comparatively harder metal, which crushes the aggregate to less than 10 mesh, which is less than 0.1 inches. In addition, there is no separation of the aggregate (mineral) component from the asphalt component of the recycled material.

Belak U.S. Pat. No. 3,260,610 discloses a process for reclaiming waste asphaltic material, such as roll roofing, asphalt shingles and asphalt siding materials, which comprises asphaltic material with one or more plies of felted paper or other cellulosic fibers, and which is usually covered with a layer of mineral material such as rock dust, or discrete granules embedded in the asphalt. Scraps of such waste asphaltic material are loaded into an impeller-mixer, together with 40 to 60 per cent water, by weight, based on the total mixture. The mass is violently agitated at 200–20,000 rpm. Ambient temperatures of 40°–120° F. are employed. There results a wet "pulverized mass". Since the starting material may include mineral granules, i.e., aggregate, and since there results a wet "pulverized mass," this patent discloses that the action of the impeller-mixer reduces the aggregate to dust. The pulverized mass of asphalt and mineral is next dried and pressed, to make a board; consequently, there is no separate recovery of asphalt and aggregate.

Good et al U.S. Pat. No. 4,222,850 discloses the processing of asphalt shingles to recover their components, using solvent extraction. Waste asphalt shingles, such as defective shingles, are shredded into small pieces, which are then introduced into a grinder; the grinder is specifically a hammer mill which grinds the product into pieces smaller than 3"×3". This material is introduced into an extractor desolventizer, where the asphalt is treated with solvent, and solids such as fiber, filler and granules are separated, and passed to a rotary screen classifier which separates fiber from granules. An air stream removes filler dust from the classifier. The solvent is removed from the asphalt, and the asphalt is recovered. Thus, there is utilized a solvent which is a material that requires special handling to avoid ecological damage, and therefore adds costs to the process. In addition, while there is separation of granules from asphalt, the granules are of substantially reduced size, having been subjected to grinding in a hammer mill.

Brock U.S. Pat. No. 4,706,893 is directed to a method and apparatus for recycling asphalt shingles in an asphalt plant. The shingles are fed into a hammer mill which comminutes the shingles to one-quarter inch or smaller, preferably one-eighth inch or smaller. From the hammer mill, the shingle particles are passed below a magnet to remove nails and other metal, and then delivered to a drum mixer into which virgin aggregate and liquid asphalt are introduced, the drum having a burner at the upper end to heat its contents. The combined materials are recovered from the drum mixer.

Ross U.S. Pat. No. 5,066,388 is directed to the recovery of bitumen from tar sands. The tar sands, containing bitumen and mineral ore solids, are introduced into an impact type pulverizer where the tar sands are reduced to 10 mesh size. The pulverized ore is passed through a screen, and then into a disengaging chamber provided with counter-rotating propellers, and internal baffles. Hot water at 180°-212° F., and caustic soda (for digestion) are introduced into the disengaging chamber where the pH is maintained between 7.5 and 9.0. Large particles of the pulverized ore are caused to impact the outer baffle area around the propellers. The slurry of bitumen, pulverized ore and water is discharged from the disengaging chamber into a separation vessel, where some of the sand settles to the bottom. Air and water at a temperature of 165° F.–190° F. are present in the separation vessel. An overflow outlet is provided in the separation vessel to remove water, bituminous material and some sand.

Wilkinson U.S. Pat. No. 597,892 discloses a process for refining asphalt by removing soluble salts and non-bituminous organic matter. The asphalt is first comminuted, either by maceration in water or by mechanical disintegration, and then the comminuted product is agitated in water. This action dissolves soluble salts and soluble non-bituminous organic matter, which are then eliminated. Suspended insoluble non-bituminous organic matter is removed, leaving asphalt free of these components. Consequently, there are ecological harmful by-products such as the soluble salts which are removed, and there is comminution by a mechanical disintegration which reduces the size of any aggregate present.

Knowles U.S. Pat. No. 3,235,482 provides a method of producing finely powdered asphaltic material by dissolving asphalt recovered from crude oil in an organic liquid solvent, and then agitating the resulting solution in a dissociating liquid such as water maintained at a temperature of at least about 124° F. The agitation is a violent and irregular movement whereby intimate contact between the solution of asphalt and water occurs, and discrete particles of the asphalt undergoing treatment separate. Agitation is accomplished by high speed stirring, a turbine mixer, mixing valve, centrifugal pump, orifice nozzle, etc. The fine particles of asphalt are separated by filtration, to recover the asphalt in powdered form. Since the starting material is asphalt recovered from crude oil, and there is no mention of aggregate, this process does not disclose that aggregate is recovered.

Jinno U.S. Pat. No. 4,359,381 discloses asphalt mixtures which have been used for road repair are passed over a vibration sieve which permits passage of particles and aggregate of less than 50 mm diameter, the larger particles passing over the sieve and being delivered to cars on rails. The cars pass through a spray tunnel containing apparatus for downwardly spraying hot water, and burners to supply heat to the sides of the containers. The heat from the hot water sprayed into the cars, and from the burners, softens the asphalt mixture. The car is hoisted to discharge the soft asphalt and aggregate mixture onto a vibrating sieve beneath which are three hoppers to receive asphalt covered aggregates of three sizes. Accordingly, there is no separation of aggregate from the asphalt, and there is a requirement for substantial energy input, due to the use of hot waters and burners.

Brashears et al U.S. Pat. No. 4,477,250 discloses a process in which old asphaltic pavement materials are recycled, utilizing an existing asphalt plant which has an aggregate dryer. The used asphaltic material is delivered to a feeder bin which is positioned to feed the old asphaltic materials to the recycled dryer and to a hammer mill which breaks up the used asphaltic material to a predetermined size. This broken up asphaltic material is fed to a recycle dryer, where it is heated by heated gases from the asphalt dryer of the asphalt plant. Additional heated air is added to the recycling dryer from an auxiliary heat source, to heat the old asphaltic materials.

SUMMARY OF THE INVENTION

The method and apparatus of the invention recycles asphalt based roofing material, such as roof shingles and asphalt felt material used for built-up flat roofs, by mechanically disengaging the components, and separately recovering them. The recovered components of the asphalt based roofing material are (a) asphalt and fiber, and (b) aggregate.

The asphalt based roofing material such as used asphalt roof shingles is cut into small particles or bodies which are preferably not in excess of one-half inch in size. These particles or bodies are then introduced into a disengagement zone which may be a part of a fiber-component separator. The component separator is a container for holding water and the asphalt-fiber-aggregate particles, i.e., an aqueous slurry, and which contains an impeller. The impeller causes movement of the aqueous slurry, causing the particles to strike each other. This action disengages the aggregate from the asphalt of the shingle particles, and also removes asphalt coating from the aggregate. The aggregate is not converted into powder, to any significant extent, nor is the size of the aggregate significantly reduced in the component separator.

The slurry which is formed contains substantially clean aggregate of unreduced size and asphalt-fiber particles or bodies substantially free of aggregate. The asphalt-fiber particles float to the top of the slurry, which action may be assisted by such flotation enhancers as air and/or reagents. A froth of air bubbles and/or reagents, and light fractions, that is asphalt-fiber particles, rises to the top of the slurry and is removed and dewatered. Aggregate is removed, separated from water, and is thereby recovered as aggregate substantially undiminished in size.

An object of the present invention is to provide a roofing material recycling method and apparatus which is economically efficient.

Another object of the present invention is to provide such a method and apparatus which has minimal energy requirements.

Still another object of the present invention is to provide a method and apparatus for recycling roofing material as herein described, to recover asphalt-fiber particles, and also to recover aggregate of substantially undiminished size from that in the recycled material.

Yet another object of the present invention is to provide a method and apparatus for recycling asphalt based roofing material which does not require the use of materials which react with or dissolve asphalt.

Another object of the present invention is to provide a method and apparatus for recycling asphalt based roofing material which avoids the use of caustics, solvents and other chemicals to affect the asphalt.

still another object of the present invention is to provide a method and apparatus for recycling asphalt based roofing material which does not utilize materials or equipment which are harmful to the ecology, or require expensive processing.

Other objects and many of the attendant advantages of the present invention will be readily understood from the accompanying specification, claims and drawings.

BRIEF DESCRIPTION OF THE DRAWINGS

FIG. 1 is a perspective view of roofing material comprising asphalt, fiber and aggregate.

FIG. 2 is a perspective view of small particles or bodies of the roofing material of FIG. 1.

FIG. 3 is a view of a component separator.

FIG. 4 is a diagrammatic view of the component separator of FIG. 3, together with an air bubble device, a component remover and a receptacle.

FIG. 5 is a view illustrating the separation of aggregate from water.

DESCRIPTION OF THE PREFERRED EMBODIMENTS

Figure 6:
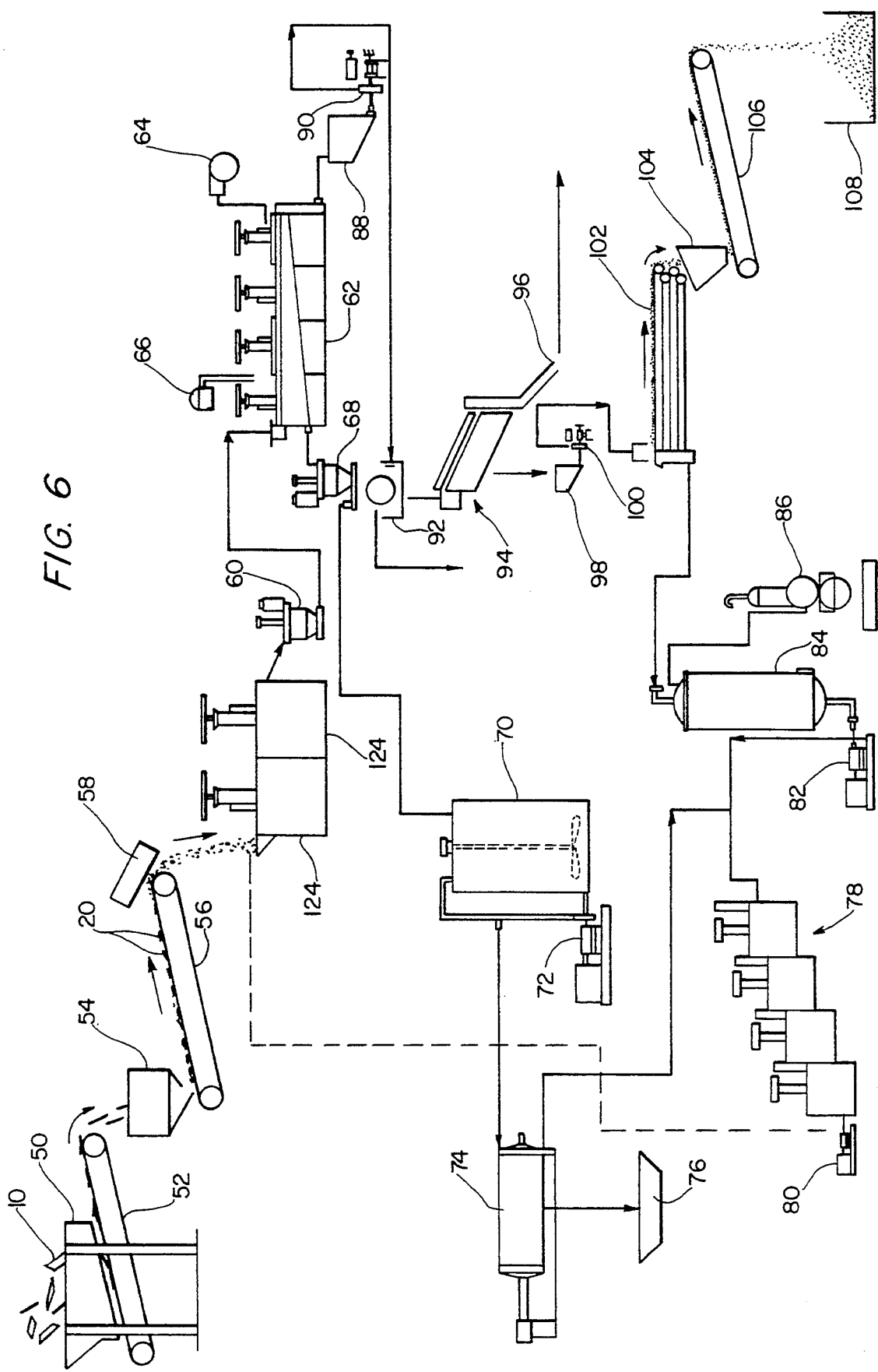
FIG. 6 is a diagram of apparatus for and illustrating a method of carrying out the present invention by continuous process.

Referring now to the drawings, wherein like or corresponding reference numerals are used for like or corresponding parts or steps throughout the several views, there is shown in FIG. 1 roofing material 10, which is asphalt based, and which may be roofing sheet or asphalt shingles. Roofing material also includes such elements as cutout portions of roofing shingles resulting from the manufacture of the shingles, or other scrap from the manufacture of roofing material. The roofing material 10 is of conventional construction, and includes fiber 12 which is impregnated with asphalt 14. The upper surface of the roofing material 10 is coated with aggregate, which is adhered to the body of the roofing material, due to the fact that the asphalt has adhesive qualities in relation to the aggregate 16.

FIG. 2 shows particles 20 which are derived from cutting of the roofing 10. The particles 20 are of small size, preferably not in excess of one-half inch.

In FIG. 3, the particles 20 have been placed into water 22 to form a slurry, being held in a component separator 24. Component separator 24 comprises a container 26 and an impeller 28. As is conventional, impeller 28 is rotated by an external motor (not shown), to cause movement of the slurry, so that the particles 20 engage or impact each other. This engagement or impacting separates or disassociates the aggregate 16 from the asphalt and fiber part of the particles 20. There is little or minimal reduction of the size of the aggregate 16, since separation of the aggregate 16 is effected only by contact with either other aggregate or parts of the particles 20 which are comprised of asphalt and fiber. The slurry is subjected to the action of the impeller 28; however, there is minimal contact of hard material of the impeller and/or side walls of the container 26 with the aggregate, and the duration of such contact does not result in any substantial reduction in the size of the aggregate 16. As will be appreciated, the speed of the impeller, the size of the impeller, the power of the motor which drives the impeller, and the duration of the action of the impeller are readily determined so as to avoid pulverizing or other diminution of the size of the aggregate.

In FIG. 4, there is shown, in addition to the component separator 24, an air source 30, which is connected with a hose 32 which extends into the container 26, having an outlet 34 therein. The outlet 34 causes air to be discharged, which is in the form of bubbles, and causes flotation of the asphalt and fiber particles 20'. Also, there may be added to the water in the container 26 a reagent 36, to aid in flotation. As will be appreciated, both the introduction of air from air source 30 and the reagent 36 may be used, or either of them may be used separately to assist in flotation of the asphalt and fiber particles 20'. The asphalt-fiber particles 20' rise to the surface of the water 22 in container 26, and may be removed by a foraminous or other collector 38, and then deposited into a receptacle 40. The aggregate 16 in the bottom of the component separator 24 may be removed in any suitable manner. For example, as shown in FIG. 5, the container 26 is inverted, pouring out the water 22 and the aggregate 16 onto a screen 42, the water passing through to a receptacle 44, after which the screen may be moved to discharge the aggregate 16 into an aggregate receptacle 46. Hence, the aggregate is recovered, is substantially undiminished in size, and is separate from the recovered asphalt and fiber particles, which are received in the receptacle 40.

The recovered asphalt-fiber particles or bodies 20' may be used for a number of purposes, including being burned for fuel. The aggregate, being substantially undiminished in size, is used for construction and other purposes.

Referring now to FIG. 6, asphalt roofing 10, such as asphalt shingles or portions of built-up roof, are delivered to a hopper 50, and are then transferred by a conveyor 52 to a shredder 54 which reduces the roofing material 10 to particles 20, which are delivered to a conveyor 56. The particles 20 pass on the conveyor 56 beneath a magnetic separator 58, and are delivered into a series of component separators 124, which are described below and which contain water. A slurry of the material from the component separators 124 is delivered to a pump 60, which causes the slurry to flow to flotation apparatus 62. A blower 64 directs air into the flotation apparatus 62, and there may be delivered in addition to or instead of air, reagents from reagent tank 66.

Asphalt-fiber particles, from which the aggregate has been separated, together with some water, flow from the flotation apparatus 62 and are delivered to a pump 68 which causes the aqueous slurry of these particles to be delivered to a surge tank agitator 70. The surge tank agitator 70 functions both as an accumulator and to provide homogeneity of the slurry.

From the surge tank agitator 70, a pump 72 delivers the slurry to a filter press 74, which dewaters the asphalt, delivering asphalt-fiber particles to the container 76, and the water or filtrate to a recycle treatment system 78, where impurities are removed from the water, and the treated water is returned by the pump 80 to the component separators 124.

Referring again to the flotation apparatus 62, aggregate, with some water, is delivered to a hopper 88, from which a pump 90 transfers the waterborne aggregate to a magnetic separator 92, the water and aggregate being then delivered to a screen 94 which delivers any free fiber and detritus which may be included in the aggregate and water mix to an outlet 96. The aggregate and water, with such free fibers and detritus removed, are delivered to a hopper 98, and is forced by a pump 100 to a belt filter 102 which separates and delivers aggregate to a hopper 104, and thence to a conveyor 106, where the clean, separated and dewatered aggregate, of substantially the same size as when it was on the asphalt based roofing material, is delivered to a container 108 which receives the recovered aggregate. Water from the belt filter 102 is delivered to the reservoir 84 by action of the vacuum pump 86. The filtrate in reservoir 84 is delivered to pump 82 to be fed to recycle treatment system 78.

Figure 7:
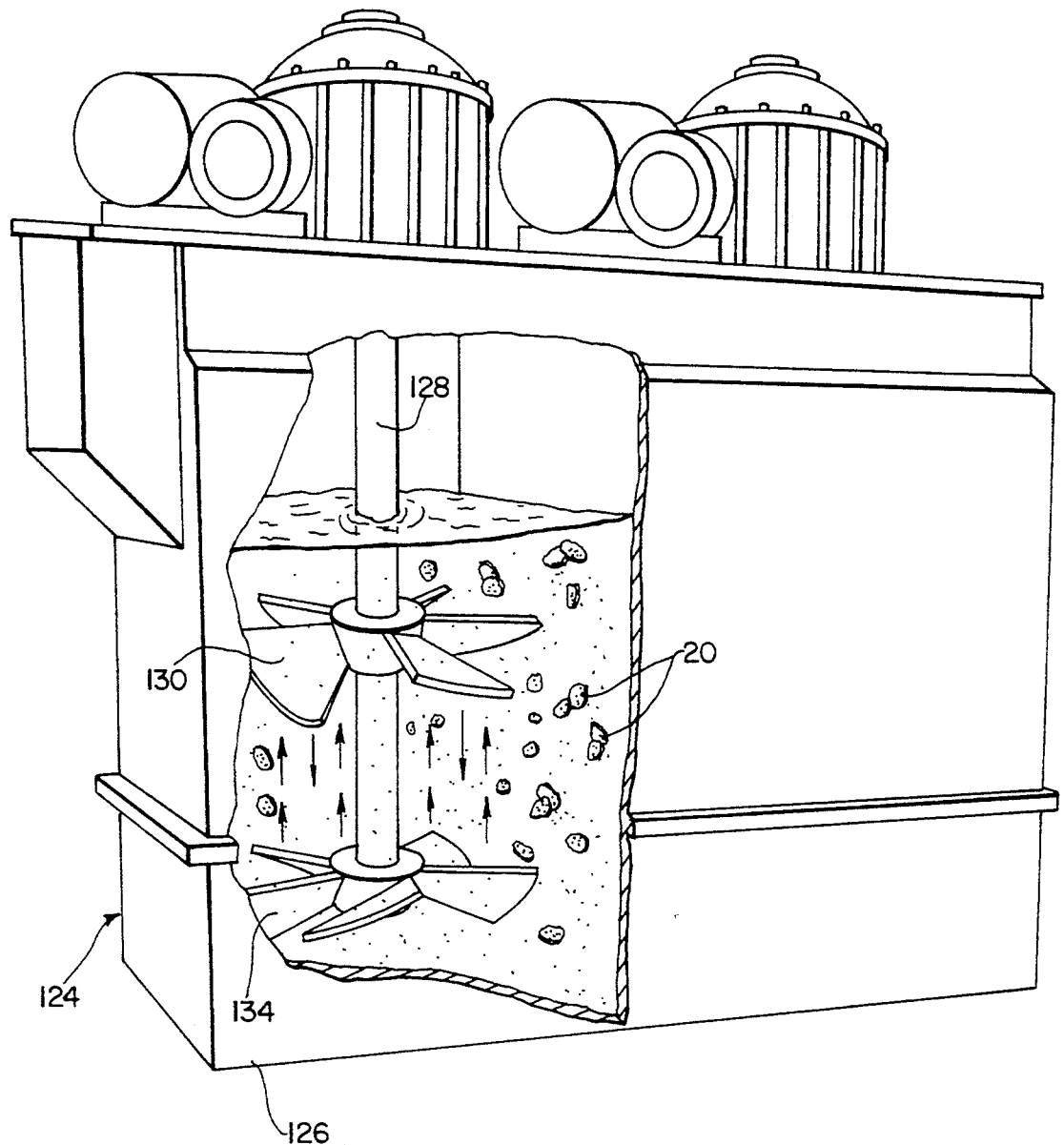
FIG. 7 is a perspective view, with parts removed of a component separator, forming a part of the apparatus shown in FIG. 6.
Figure 8:
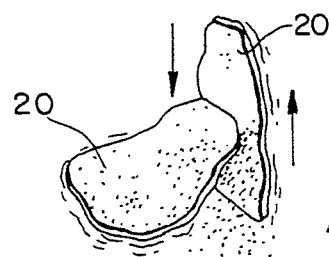
FIG. 8 is a view illustrating the action of the component separator.

In FIG. 7, there is shown a component separator 124, which may be seen to comprise a tank 126 having therein a shaft 128 to which a first impeller 130 and a second impeller 134 are attached in spaced relation. The impellers 130 and 134 are oppositely pitched, so that an agitated, counter-flowing stream of water and particles 20 are generated to provide a disengagement zone as in the component separator 24. This flow, as does the flow in the component separator 24, causes the particles 20 to strike against each other, as illustrated in FIG. 8. It will be appreciated that the particles 20 will have different relative orientations; they will translate and/or rotate in their movement within the tank 126, randomly exposing various surfaces of each particle 20 to engage and be engaged by another particle 20. Consequently, there is only an impacting or striking of one particle or body 20 against another particle or body 20, and there is a minimum of striking of the aggregate by harder material such as metal. Therefore, there is minimal reduction of aggregate size. As hereinbefore noted, the determination of the rate of flow of slurry through the component separator 124 (the dwell time), the speed and physical characteristics of the impellers 130 and 134, and the power of the motor may be readily determined for each installation, so as to avoid significant disintegration of the aggregate.

The herein disclosed method and apparatus, both that shown in FIGS. 1-5 and that shown in FIG. 6, will provide for the separation of aggregate from asphalt based material, and the separate recovery of each, without the utilization of solvent or other environmentally objectionable chemicals, such as caustics, and does not require the utilization of energy for heating or cooling. Further, the method and apparatus herein disclosed enables the separate recovery and re-use of asphalt, which may typically contain fibers as is the case with asphalt roofing products, and aggregate, which is clean and of undiminished size. With the present apparatus and method, there is minimal striking of the aggregate by a harder material, such as a metal roller, chain, etc., so that there is minimal comminution or other reduction in size of the aggregate. There may be some generation of aggregate of reduced size and, possibly, some pulverization; such byproducts are minimal, and do not significantly detract from the economic advantage of the herein disclosed method and apparatus in which there is recovered re-usable aggregate.

The claims and specification describe the invention presented, and the terms that are employed in the claims draw their meaning from the use of such terms in the specification. Some terms employed in the prior art may be broader in meaning than specifically employed herein. Whenever there is a question between the broader definition of such term as used in the prior art and the more specific use of the term herein, the more specific meaning is meant.

What is claimed is:

1. A method for recovering asphalt and aggregate from roofing materials wherein said roofing materials are asphalt shingles or built up roofing and said roofing materials comprise multiple asphalt bodies each having a surface with aggregate coated thereon and adhered to the asphalt of said asphalt bodies comprising:
   introducing plural said asphalt bodies into a disengagement zone containing a liquid to form a slurry therein
   disengaging the aggregate from the asphalt bodies in said disengagement zone substantially without heating said asphalt bodies, and without significant reduction in the size of the aggregate, said disengaging consisting essentially of causing said bodies to mutually impact each other;
   separating and recovering said disengaged asphalt bodies substantially free of disengaged aggregate; and
   recovering disengaged aggregate of substantially unreduced size.

2. The method of claim 1, wherein the providing of asphalt bodies is the providing of bodies comprised of asphalt and fiber.

3. The method of claim 1, and further comprising introducing liquid into said disengagement zone.

4. The method of claim 3, wherein said liquid introduced into said disengagement zone is not a solvent for asphalt.

5. The method of claim 3, wherein said liquid introduced into said disengagement zone is water.

6. The method of claim 3, wherein said causing of said bodies to mutually impact is by effecting movement of said liquid with said bodies therein.

7. The method of claim 3, wherein said bodies are caused to mutually impact by causing said liquid and said bodies therein to move by at least one impeller.

8. The method of claim 3, wherein asphalt bodies substantially without aggregate rise to the top of the liquid, and further comprising removing said asphalt bodies substantially without aggregate from the top of the liquid.

9. The method of claim 3, wherein said recovery of aggregate comprises removing aggregate from said liquid.

10. The method of claim 3, wherein said disengagement zone is in a container, and wherein said introduced liquid is a non-asphalt dissolving liquid, and said causing of impacting of said bodies is by causing agitated flow of said liquid with said asphalt bodies therein in said container.

11. The method of claim 10, wherein said recovery of aggregate is by discharging the aggregate and at least some of said liquid from said container.

12. The method of claim 11, and further comprising separating said aggregate from said liquid.

13. The method of claim 3, wherein said bodies and liquid are utilized without change in the temperature thereof.

14. The method of claim 3, wherein there is not utilized energy for heating or cooling.

15. The method of claim 1, wherein there is not utilized energy for heating or cooling.

* * * * *